(12) United States Patent
Vary et al.

(10) Patent No.: US 6,546,515 B1
(45) Date of Patent: Apr. 8, 2003

(54) METHOD OF ENCODING A SIGNAL

(75) Inventors: Peter Vary, Aachen (DE); Stefan Heinen, Düren (DE); Stefan Bleck, Mettmann (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/505,197

(22) Filed: Feb. 16, 2000

(30) Foreign Application Priority Data

Jun. 18, 1999 (EP) .............................. 99440156

(51) Int. Cl.[7] ................. G06F 11/00; H03M 13/00
(52) U.S. Cl. ...................................... 714/746
(58) Field of Search ................... 714/752, 746, 714/786, 799; 704/222; 375/240.03

(56) References Cited

U.S. PATENT DOCUMENTS 5,091,945 A * 2/1992 Kleijn ..................... 704/102

FOREIGN PATENT DOCUMENTS

| DE | 197 16 147 A1 | 10/1998 |
| EP | 0 529 909 A2 | 3/1993 |
| EP | 0 643 493 A1 | 3/1995 |

OTHER PUBLICATIONS

Fingscheidt et al., Speech Decoding with Error Concealment using Residual source Redundancy, IEEE, p. 91–92, 1997.*
Phamdo et al., Source–dependent Channel Coding of CELP Speech over Land Mobile Radio Channels, IEEE, p. 1041–1045, 1995.*
Heinen S.; Adratm M.; Steil O; Vary P; Xu W.: "A 6.1 to 13.3–kb/s variable rate CELP codec (VR–CELP) for AMR speech coding" 1999 IEEE International Conference on Acoustics, Speech, and Signal Processing. Proceedings. ICASSP99, Bd. 1, Nr. 1, Mar. 15–19, 1999, Seiten 9–12, XP002121916.

* cited by examiner

Primary Examiner—Albert Decady
Assistant Examiner—Shelly A Chase
(74) Attorney, Agent, or Firm—Sughrue Mion, PLLC

(57) ABSTRACT

A method of encoding a signal, particularly a message signal for speech and/or image transmission, in which signal-matched encoding of the signal with M bits is performed using Q quantization levels, with $Q<2^M$, and in which at least part of the remaining bit rate or the entire redundancy of $M-Id(Q)$ bits is used to protect the signal against errors. The error protection uses a nonlinear code, for example. Furthermore, additional, signal-matched code redundancy can be added to an arbitrary source-coded signal. To decode the redundant signals in both cases, parameter estimation is performed at the receiving end using at least part of the redundancy.

2 Claims, 5 Drawing Sheets

| | |
|---|---|
| $u_0 = 0.238$ | $v_{t_1} = [1101]$ |
| $u_1 = 0.573$ | $v_{t_1} = [1111]$ |
| $u_2 = 0.9$ | $v_{t_2} = [1100]$ |
| $u_3 = 1.25$ | $v_{t_3} = [1110]$ |
| $u_4 = 1.64$ | $v_{t_4} = [1011]$ |
| $u_5 = 2.1$ | $v_{t_5} = [1010]$ |
| $u_6 = 2.62$ | $v_{t_6} = [0110]$ |
| $u_7 = 3.22$ | $v_{t_7} = [0011]$ |
| $u_8 = 3.93$ | $v_{t_8} = [0010]$ |
| $u_9 = 4.80$ | $v_{t_9} = [0001]$ |
| $u_{10} = 5.92$ | $v_{t_{10}} = [0000]$ |

METHOD OF ENCODING A SIGNAL

BACKGROUND OF THE INVENTION

This invention relates to a method of encoding a signal, particularly an analog, time-varying signal for speech and/or image transmission. The encoding is used, for example, in transmitting equipment of a communications system. The communications system is, for example, a wireline or wireless system or a hybrid system. Conventional wireline systems are, for example, telephone networks, cable television networks, or the like. Conventional wireless systems are, for example, radio communications systems, radio relay systems, mobile radio systems, GSM networks, CDMA networks, UMTS networks, DECT networks, or satellite-based networks, such as "Iridium".

In present-day digital communications systems, the analog signal provided by the data source, e.g., speech=sound, audio, or image=video, is subjected at the transmitting end to a data compression in order to reduce the redundancy contained in the signal and thus minimize the bandwidth needed for transmission. This signal processing method is referred to as "source coding".

Source coding for speech is generally based on a model of the human vocal tract, and only those current parameters of the model which describe the current speech are transmitted to the receiver. There, the speech is synthesized by means of the parameters.

Similar signal processing methods are used in image transmission, where a set of pixels is subjected to a transform, and the transform coefficients as well as motion vectors and control signals are transmitted as parameters.

During data transmission, parametric quantities (signal values, filter coefficients, amplification factors, etc.) are determined, which are then quantized and encoded into sequences of binary digits. The number of quantization levels of the individual parameters is frequently a power of two.

During the transmission of the quantized parameters over real transmission channels, errors arise. Errors in particular bits, so-called sensitive bits, of the sequence generally result in a more severe degradation of the received signal quality than errors in less sensitive bits. Therefore, the bits of the source encoder are grouped in sensitivity classes, for example, for which different degrees of error protection are used in the form of error-correcting codes. This method is generally referred to as channel coding with unequal error protection (UEP).

By the source coding methods, the parametric quantities to be transmitted are, as a rule, quantized in such a way that the signal-to noise ratio (SNR) at the transmitting end is maximized for the available bit rate. The number of possible quantization levels is frequently a power of two $2^M$, so that the M bits used for source coding can be fully utilized.

SUMMARY OF THE INVENTION

Furthermore, source coding and channel coding are optimized largely separately.

It is an object of the invention to provide a novel method of encoding a signal which comprises source and/or channel coding.

The invention relates to a method whereby the nonintegral excess share of M–Id(Q) bits during the (source) coding of a quantized parameter can be systematically used to increase error robustness, i.e., during the quantization of an amplitude-continuous parameter with a quantizer whose number of levels is not a power of two, the nonuse of some binary indices (binary patterns) is to be used at the transmitting end to provide systematic error protection, with table decoding being preferably used at the receiving end in conjunction with a parameter estimator. A code redundancy, e.g., an algebraically constructed code redundancy, is no longer decoded by conventional channel decoding using some kind of a hard or soft decision, but indirectly by means of parameter estimation. Thus, error robustness can be further increased by adding a code redundancy at the transmitting end, such as an error correcting-code. During the parameter estimation at the receiving end, this code redundancy is incorporated into the decoding.

It frequently turns out that a scalar or vectorial quantization into $2^{M-1} < Q < 2^M$ levels is sufficient to guarantee the required basic quality, e.g., the SNR, of the compression process. In prior-art methods, the remaining effective word length of M–Id(Q) bits (Id=logarithm to the base 2) per parameter causes an improvement in the basic quality at the transmitting end, which may not be necessary. If only a minimum quality is required, this is suboptimal in terms of the quality received over a noisy channel, since the proportionate data rate, corresponding to M–Id(Q) bits per parameter, should be turned to better account; it should be used, for example, to increase error robustness.

In prior-art methods in which a redundancy-increasing quantization is achieved by leaving some binary indices unused, this is not done with a view to systematically increasing error robustness.

At the transmitting end, prior-art methods do not take into account that instead of parameter decoding, an estimation of the parameter value can be performed at the receiving end, whereby error robustness is further improved, see Patent Application DE 197 16 147.2.

In prior-art methods, complex channel decoding is used at the receiving end to decode the redundancy of an error-correcting code.

Some advantages of the invention are as follows.

The association between quantized parameter values and bit codes to be transmitted is chosen optimally to meet a suitable criterion regarding parameter characteristics and channel characteristics which takes into account the characteristics and sensitivities of the source signal.

Any number of $Q < 2^M$ quantization levels can be encoded with M bits in such a way that the redundancy of M–Id(Q) bits can be used to provide optimum error protection by minimizing the mean error between the input and output of the communications system. In particular, Q need not be power of two.

By varying the number of quantization levels, the share of useful information and error-protecting redundancy in the gross bit stream can be adjusted in fine steps. If required, an additional redundancy of a code can be added.

Because of the signal-matched coding (source and/or channel coding), all bits used to encode a parameter can then have approximately the same low sensitivity to transmission errors.

The error protection is parameter-, not bit-oriented. As a result, the residual redundancy still present after source coding can be used to increase error robustness and thus achieve a higher transmission quality.

The novel method supports the receive-side parameter estimation already on the transmit side in optimum fashion, so that significant gains can be achieved over conventional decoding.

BRIEF DESCRIPTION OF THE DRAWINGS

In prior-art methods using source-optimized quantization, no automatic adaptation of the receive-side decoder to the respective channel status takes place as is the case with the present invention, but decoding is accomplished using a static table whose entries were determined by off-line optimization based on long-term statistics about the transmission channel.

The invention will become more apparent from the following description of five embodiments taken in conjunction with the nine figures of the accompanying drawings, in which.

DETAILED DESCRIPTION OF THE INVENTION

Figure 1:
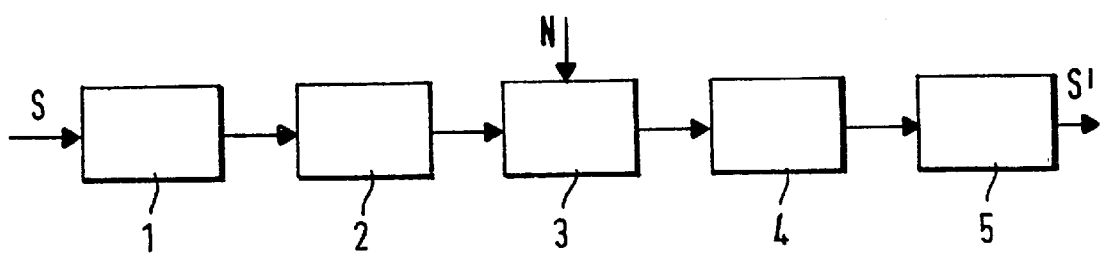
FIG. 1 is a schematic block diagram of a prior-art communications network for digitally transmitting an analog signal.

Referring to FIG. 1, there is shown a first prior-art communications network, in reference to which the first embodiment of the invention will be explained.

The communications network is implemented as one of the networks referred to above. The transmitter, for example a base station of a mobile radio network, contains, besides a large number of devices that are not shown, such as signal-conditioning equipment, signal-processing equipment, channel assignment, multiplexer, etc., an encoder 1, 2 consisting of a quantizer 1 and a mapping device 2. The encoder 1, 2 serves as a source coder and/or channel coder, for example.

The quantizer 1 operates, for example, with 4 bits to quantize an analog signal S, e.g. a speech signal, into 16 quantization levels. The signal S to be transmitted contains, for example, a model parameter that is assumed to have a zero-mean Gaussian distribution of variance σ=1. This real-valued parameter is quantized, and transformed into a bit sequence by mapping without increasing redundancy. The mapping takes place in the mapping device, which, using a table, for example, maps the quantization levels to bit sequences. In the example, the bit sequences have a length of 4 bits, for example 0110, 1000, 0010, etc.

The signal thus encoded is transmitted over the transmission channel 3 to one or more receivers 4, 5, such as a mobile radiotelephone, and, if required, provided prior to transmission with additional redundancy, such as the redundancy of an error-detecting or error-correcting code. The transmission channel is noisy, so that during transmission, the signal S is superposed with a noise signal N, which complicates the decoding at the receiver 4, 5.

At the receiver 4, 5, decoding is performed using a hard decision for each bit. To accomplish this, the receiver 4, 5 includes a decision block 4. This decision block 4 is, for example, a threshold detector that can detect ones and zeros in the received bit stream. In the course of the subsequent table decoding in a decoder 5, these bits are combined into table indices, and a corresponding table entry (e.g. the value of a parameter) is output. This is followed by the further processing.

As a rule, minimum requirements are fixed for systems that are lossy due to quantization. The minimum requirement for the parameter of a system could be, for example, that the quantization at the transmitting end must not fall below a given signal-to-noise ratio (SNR).

In the system shown, the minimum requirement for the signal-to noise ratio is assumed to be 15 dB. For the transmission of the parameter value, a data rate of 4 bits per parameter value is available.

To meet the minimum requirement of 15 dB, quantization with 3 bits (8 quantization levels) is not sufficient. Therefore, quantization with 4 bits (16 levels) is performed, whereby an SNR of 20.2 dB is obtained at the transmitting end. The total available data rate is thus used for quantization. The receiver 4, 5 makes a hard decision and then performs table decoding.

Figure 2:
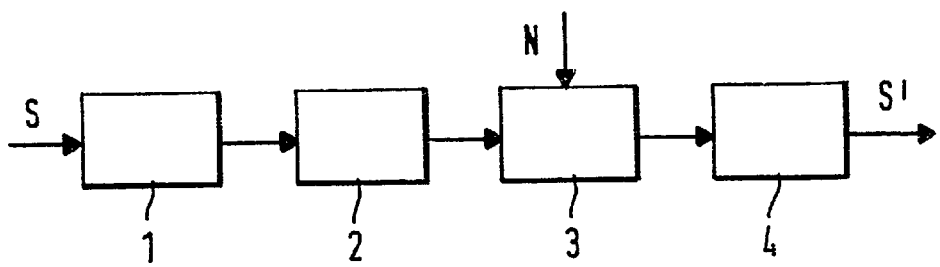
FIG. 2 is a schematic block diagram of another prior-art communications network for digitally transmitting an analog signal.

The second embodiment will now be described with reference to FIG. 2. FIG. 2 shows a second communications network, which is known from DE 19716147.2, for example.

The communications network corresponds to that of FIG. 1 except that the decoding at the receiver is performed in a different manner. The dimensioning is chosen as in the first embodiment, but decoding is performed by means of a parameter estimator 6. The parameter estimator 6 permits error concealment in digital transmission systems in which a distribution function is determined at the receiving end to estimate transmitted parameters. The distribution function provides a probability distribution for each possibly transmitted source code parameter.

In the parameter estimator 6, a distribution function is shifted by an amount equal to the output signal value of a predictor, and integrated section by section to obtain a new distribution function. This new distribution function is multiplied by a distribution function taking into account the current reception quality. The result is an a posteriori distribution, which is used in conventional estimation schemes for eventual parameter estimation. This parameter value need not be equal to a value known from the quantization; as an estimate, it can assume arbitrary intermediate values.

The receiver thus determines an estimate of the actually transmitted parameter value directly from the received bit sequence.

Figure 3:
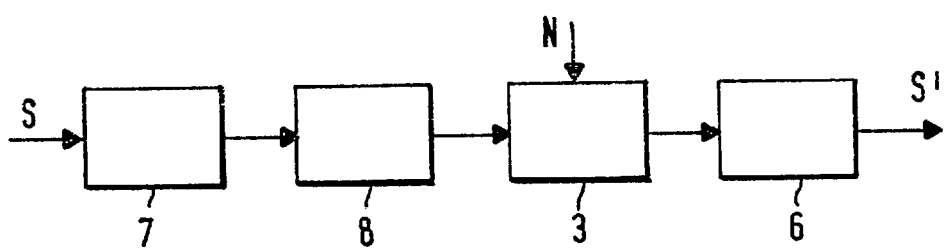
FIG. 3 is a schematic block diagram of a communications network according to the invention for digitally transmitting an analog signal.

The third embodiment will now be described with reference to FIG. 3. FIG. 3 shows a communications network in accordance with the invention.

The communications network corresponds to that of FIG. 2 except for the fact that the encoding at the transmitter is performed in a different manner.

The encoding is performed in a quantizer 7 followed by an encoder 8.

In the encoder 8, signal-matched encoding is performed.

Unlike the first two embodiments, the quantizer 7 is dimensioned so that the minimum requirement is just met. For this, 10 quantization levels are sufficient, since the quantizer then achieves an SNR of 16.2 dB. Then, the number of quantization levels is, as a rule, not equal to a power of two. By means of the quantizer 7, a value-continuous parameter, such as an amplitude factor, an excitation vector, or a filter coefficient, is quantized. The signal-matched encoding uses the mathematically remaining bit rate of Id(16)–Id(10)=0.68 bits as well as the redundancy remaining after the quantization to provide error protection. If the signal S is encoded with M bits, the total remaining redundancy of M–Id(Q) bits can thus be used to provide error protection; Q=quantization levels. In addition, a code redundancy can be added. Decoding is performed at the receiver using a parameter estimator 6 as in the second embodiment.

Quantizer 7 and encoder 8 together form a voice and/or image encoder, for example. The speech signal and/or image signal are represented by a set of parameters. The error protection technique according to the invention combines optimized parameter quantization with redundant nonlinear block coding. Use is made of a source-optimized quantizer 7 that uses a nonintegral source coding bit rate, i.e., the bit rate used for source coding is not divisible by an integer. This coding is referred to as "nonlinear coding". The aim is a maximum end-to-end parameter SNR. An arbitrary number of Q quantization levels is possible, to which code words are assigned, with $Q<2^M$. The effective bit rate Id(Q), which is used for source coding, is thus always less than M bits. The optimum number of quantization levels and the assignment of the code words are chosen so that the end-to-end parameter distortion is minimized. The selection can be made, for example, using a matched pseudo-Gray code or a Hadamard transform. For example, a predetermined or randomly selected assignment of code words to parameter values is assumed. The code words of two parameter values are interchanged, and the result is detected and evaluated at the receiver. If the result is better than the previous constellation, the new constellation will be retained; if it is worse, the previous constellation will be retained. Then, the code words of two further parameter values are interchanged, so that the association between parameter values and code words is iteratively optimized.

Only the transmission from, e.g., a base station to a mobile station has been described. The method according to the invention is also suitable for bidirectional transmission. The speech encoder/decoder (speech codec) then includes a quantizer and an encoder for the transmit direction and at least one parameter estimator for the receive direction.

The method according to the invention can be combined with error-correcting techniques, e.g. by simple superposition of a forward error correction technique for the transmission channel.

The parameter estimator 6 determines an optimum estimate taking into account the number of quantization levels and channel status information in the form of, e.g., a bit error probability distribution or a noise power probability distribution, which is assumed to be known. The number of quantization levels is chosen so as to maximize the quality of the estimated source symbols at the receiving end. In the prior art, the channel coding is designed to minimize the error rate of the channel symbols.

A suitable quality measure for the amplitude factor is the negative square error between transmitted and estimated source symbols or parameters. A mean square estimator, for example, is used for the parameter estimator 6.

Figure 4:
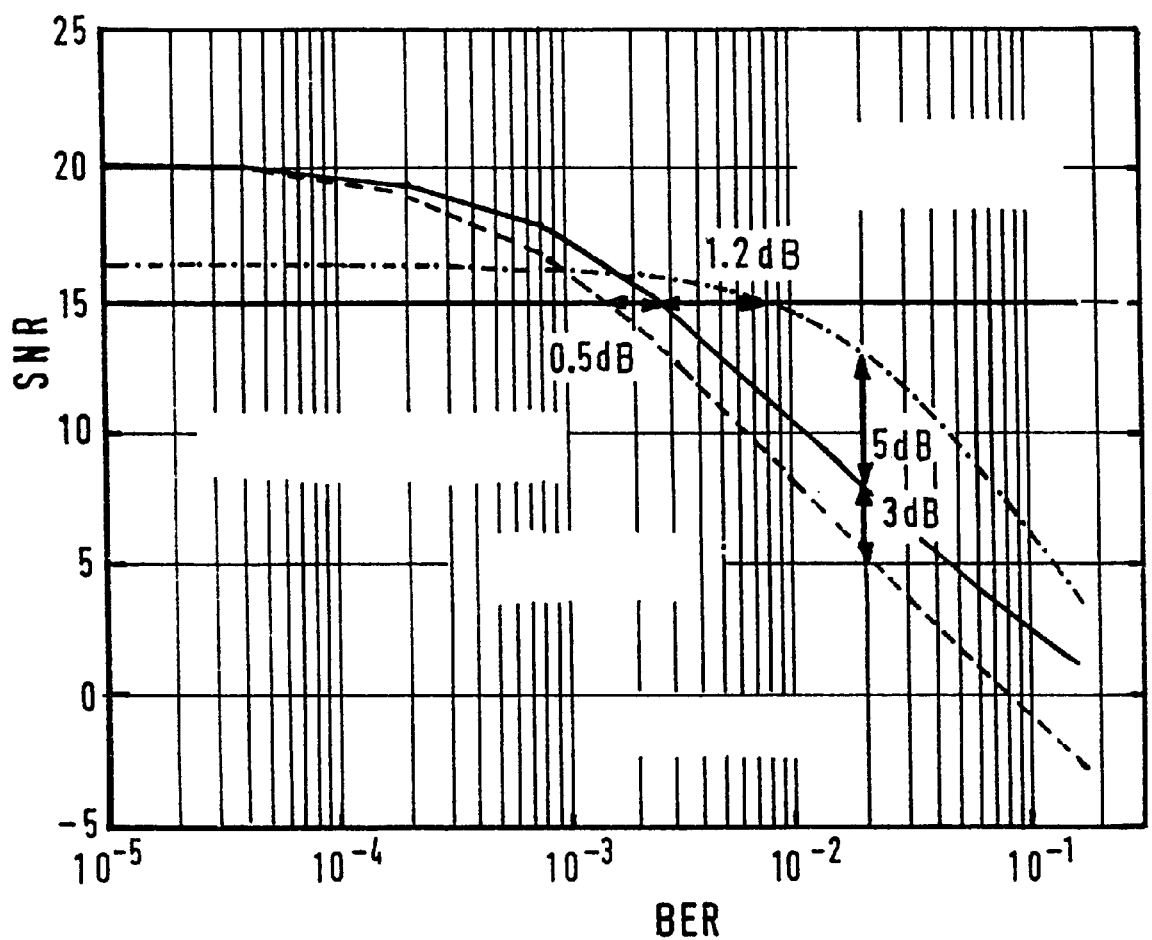
FIG. 4 is a diagram comparing the bit error rates in communications networks as shown in FIGS. 1 to 3.

The following describes the diagram of FIG. 4. All function blocks required to transmit the bit sequence from the transmitter to the receiver are combined in an equivalent channel. In the simulation shown, the error on this equivalent channel is approximated by additive white (or Gaussian) noise.

FIG. 4 shows the behavior of the three embodiments for different effective bit error rates. The effective bit error rate is the bit error rate obtained with BPSK modulation over a transmission channel after a hard decision.

The first embodiment shows a high parameter SNR of approximately 20 dB for low bit error rates, but this is an unnecessary overfulfillment of the minimum requirement. The minimum requirement can only be met up to a bit error rate of about $1.5 \cdot 10^{-3}$.

Through use of a parameter estimation at the receiving end, e.g. a parameter estimation according to the second embodiment or a specifically adapted variant thereof, the parameter SNR improves for all bit error rates. At a bit error rate of $2 \cdot 10^{-2}$, the gain is about 3 dB. The channel gain over the first embodiment is 0.5 dB. "Channel gain" means that reduction of the SNR of the channel for which the minimum requirement is still fulfilled.

The third embodiment provides a substantial improvement in transmission quality at medium and high bit error rates. The minimum requirement can be met up to a bit error rate of $8 \cdot 10^{-3}$, which corresponds to a channel gain of about 1.7 dB. The increase in transmission quality attainable with the third embodiment becomes even more apparent in the presence of large channel errors. At a bit error rate of $2 \cdot 10^{-2}$, for example, the parameter SNR improves by about 8 dB over the first embodiment and by about 5 dB over the second embodiment.

The third embodiment can be varied as follows. Instead of one signal or parameter, two or more signals or parameters can be encoded together, e.g. by vector quantization, with the bit rate to be transmitted being minimized. In the prior art, 4-bit encoding is performed for each signal or parameter, so that a total of 12 bits are needed for three signals or three parameters, with 16 quantization levels being used for each encoding operation. If, instead of 16 quantization levels, only 10 quantization levels are used per signal or parameter, a total of only 30 quantization levels are needed for three signals or parameters. These can be encoded with 5 bits. From this it follows that three signals or parameters can be transmitted with only 5 bits. Compared with the prior art, this corresponds to a reduction by 7 bits. The remaining, unused bit rate of M–3xId(Q), where M=5 and Q=10, can then be used for error protection, e.g. for all signals or parameters together or for each signal or parameter separately. If the unused bit rate alone should not suffice to provide error protection, one or more bits of a redundant code (e.g. parity) can be added. Then, three signals or three parameters would be transmitted with 6 bits, which would still correspond to a saving of 6 bits. The number of signals or parameters to be transmitted can thus be optimally adapted to the available bit rate. Instead of providing error protection, control signals can be transmitted using the unused bit rate, irrespective of the number of signals or parameters. The control signals serve maintenance, i.e., monitoring, purposes, for example. Through the quantization optimized at the transmitting end, transmission capacity becomes available which, as a rule, has a rate less than 1 bit and can be used for various other transmissions, including those messages or signaling signals which are independent of the signal to be transmitted.

Figure 5:
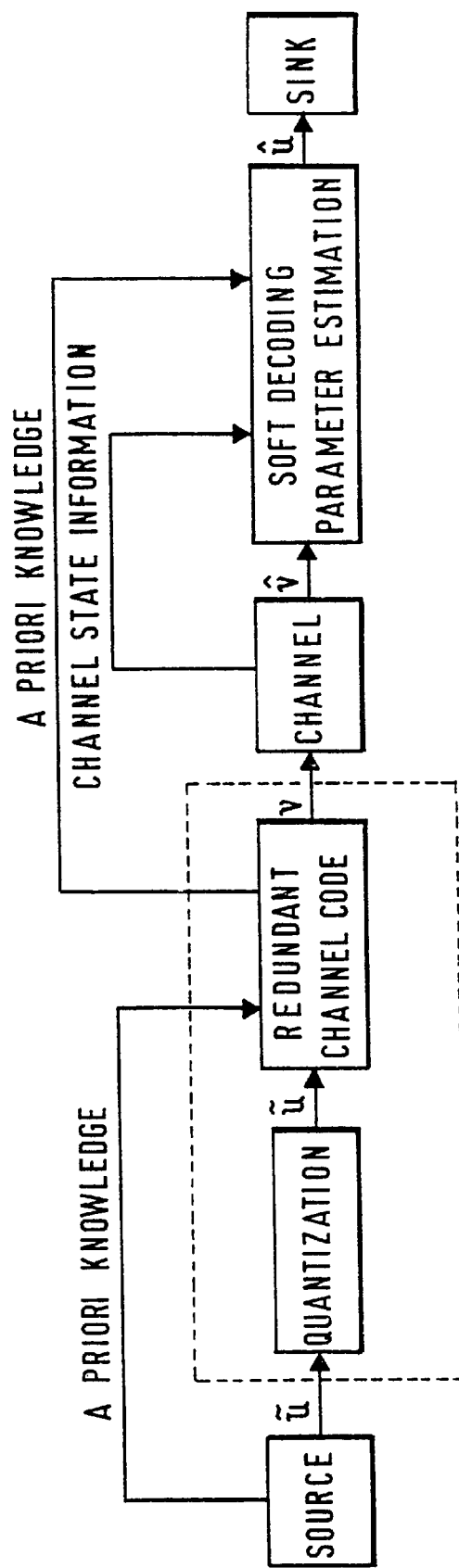
FIG. 5 is a schematic block diagram of another communications network according to the invention for digitally transmitting an analog signal.
Figures 6, 7:
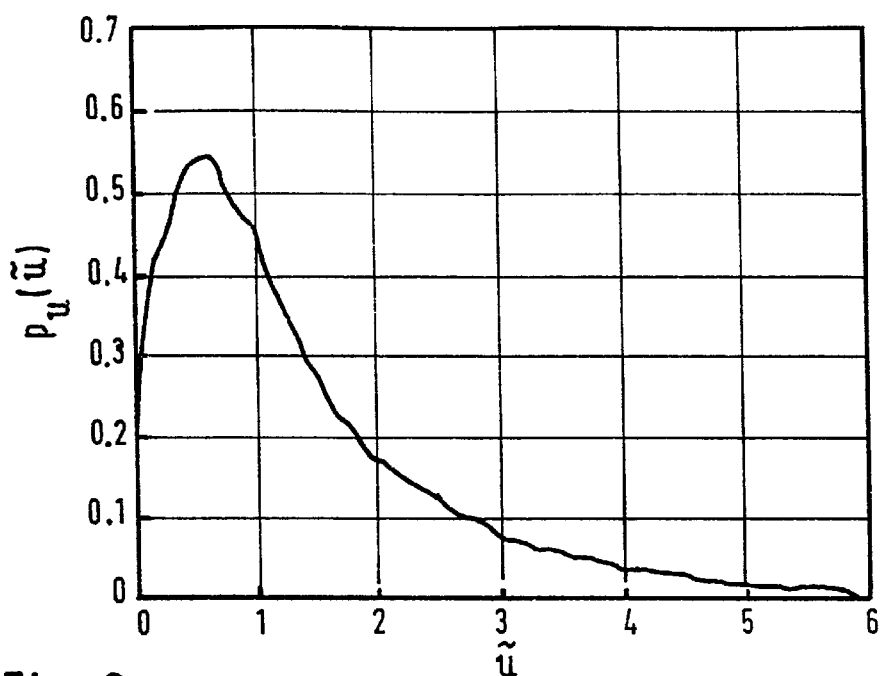
FIG. 6 is a diagram showing the probability density of the amplitude factor.
FIG. 7 is a table representing the mapping of the quantization levels to binary code words.

The fourth embodiment will know be explained with the aid of FIGS. 5 to 7.

In speech coding techniques based on the code excited linear prediction (CELP) principle, the source signal is described essentially by three types of parameters: filter coefficients, excitation vectors, and amplitude factors.

The combined source and channel coding can be used to advantage to protect the amplitude factors against transmission errors, for example.

In conventional CELP encoders, the amplitude factors are quantized into 8 or 16 levels, for example. In many cases, quantization into 8 levels (3 bits) is not sufficient, so that quantization into 16 levels (4 bits) is necessary to achieve a required basic quality.

The method according to the invention, unlike prior-art systems where the number of quantization levels is chosen to be a power of two, makes it possible to perform quantization into precisely that number of levels with which the required basic quality is achieved. If that is the case with 11 quantization levels, for example, quantization/encoding con be performed at rate of $$\frac{ld(11)}{4} \text{ bits per parameter value.}$$

To ensure sufficient quality in the presence of poor channels, it may be appropriate to reduce the number of quantization levels even further in order to make more redundancy available for error protection, or to add further redundancy. In the present example, quantization into N=11 levels is to be performed. For transmission, a data rate of M=4 bits is available per source symbol.

FIG. 5 shows the transmission path with combined source and channel coding for an amplitude factor $\tilde{u}$.

The label "Quantization" denotes one ore more quantizers with one or more adjustable quantization levels. "Redundant Channel Coding" denotes one or more encoders for performing one or more error protection encoding operations.

The value-continuous amplitude factor $\tilde{u}$ is quantized by an assignment to N possible source symbols U={u1, ... ,uN}. These are mapped to N channel symbols V'={vt1, ... ,vtN}. The source symbol $u_i$ is assigned the channel symbol $v_{t_i}$, i=1, ... , N, with the following mapping: T:U→V'.

Since the number of channel symbols V={v1, ... ,vM} is greater than the number of quantization levels (M>N), T is a redundancy-increasing mapping or encoding operation. In the encoding operation, transmitted and stored a priori knowledge about the source, e.g. about the parameters modeled from the analog time-varying signal, can be used. Parameters may be, for example: filter coefficients, gain coefficients, excitation vectors, parameters relating to loudness, vocal cords, etc. After transmission of the channel symbols v over the noisy channel, possibly erroneous channel symbols $\hat{v}$ are obtained. These are fed to a symbol estimator which determines the optimum estimate $\hat{u}_T$ taking into account transmitted and stored a priori knowledge about the source, the mapping T, and channel status information (e.g., in the form of a known bit error probability distribution or a known noise power probability distribution), thus providing a quality measure. The information to be taken into account is, for instance, made available in the form of tables using conditional probabilities, so-called Markov chains, for example.

The mapping used, unlike the prior-art channel coding, is generally nonlinear, since the quantity of channel symbols V' is chosen so as not to form an enclosed vector subspace, so that the linearity requirement is not satisfied.

The mapping T is chosen so that the expected value of the quality measure C (u, $\hat{u}_T$) between transmitted parameter value u and estimated parameter value $\hat{u}_T$, which is relevant with respect to the source symbols, becomes maximal:

$$E_{U,\hat{U}_T}\{C(u,\hat{u}_T)\} = \max_T$$

Thus, through the mapping determined, T, redundancy is added to the transmitted data with the aim of maximizing the quality of the estimated source symbols at the receiving end. By contrast, the channel coding in prior-art methods is designed essentially to minimize the error rate of the channel symbols, which is suboptimal with regard to a maximum quality of the source symbols.

In the fourth embodiment being described here, a suitable quality measure for the amplitude factor being considered is the negative square error between transmitted source symbol and estimated source symbol, i.e., $$C(u,\hat{u}_T) = -|u-\hat{u}_T|^2$$

To simplify the representation, the noisy transmission channel will be taken to be a zero-memory binary symmetric channel with bit error probability $P_e$. The probability P(k) of a k-fold bit error within a received channel symbol consisting of m bits is then given by $$P_m(k) = P_e^k \cdot (1-P_e)^{m-k}.$$

Because of the quadratic quality measure chosen, the mean square estimator is the optimum estimation method at the receiving end. This estimator minimizes the mean square error between transmitted parameter value and received parameter value for a specific mapping: T:U→V. The estimation rule for the parameter $\hat{u}_T$ given a received code vector $\hat{v}$, is $$\hat{u}_T(\hat{v}) = \frac{\sum_{i=1}^{N} u_i \cdot P_M(|T(u_i) \oplus \hat{v}|) \cdot P_u(u_i)}{\sum_{i=1}^{N} P_M(|T(u_i) \oplus \hat{v}|) \cdot P_u(u_i)}.$$

where $\oplus$ denotes a bit-by-bit exclusive OR operation applied to two channel symbols, and $|\cdot|$ denotes the absolute value (or the weight) of a channel symbol.

Thus, the function to be maximized with respect to the mapping T is $$E_{U,\hat{U}_T}\{C(u, \hat{u}_T)\} = E_{U,\hat{V}}\{(u, \hat{u}_T(\hat{v}))\} = \max_T.$$

Because of the statistical independence between the transmitted parameter value and the channel error, the expected value can be determined by $$E_{U,\hat{V}}\{C(u, \hat{u}_T(\hat{v}))\} = -\sum_{i=0}^{N-1} \sum_{j=0}^{2^m-1} |u_i - \hat{u}_T(\hat{v}_j)|^2 \cdot P_u(u_i) \cdot P_m(|T(u_i) \oplus v_j|).$$

To be able to utilize the distribution-depended redundancy of the parameter $\tilde{u}$ for encoding, it is necessary to measure the density function $p_u(\tilde{u})$ of the parameter using a representative speech sample. FIG. 6 shows the result of such a measurement for a value-continuous parameter $\tilde{u}$.

By piecewise integration over the quantization intervals, probabilities of occurrence $P_u(u_i)$ of the quantization levels $u_i$ are obtained.

The table in FIG. 7 shows a mapping T for M=16, N=11, which is suitable for the example of FIG. 6.

To further increase error robustness, the combined source and channel coding described can be additionally linked with conventional channel coding.

In the fourth embodiment, at the transmitting end, a redundant mapping $$T:U \rightarrow V'$$

of N source symbols $U=\{u_1, \ldots, u_N\}$ to a subset $V'=\{v_{t_1}, \ldots, v_{t_N}\}$ of all M possible channel symbols $V=\{v_1, \ldots, v_M\}$ is performed, $M \geq N$ and $V' \subset V$. At the receiving end, instead of conventional channel decoding in the form of error detection or correction, a real-valued scalar or vectorial symbol or parameter estimation is preferably performed, taking into account a priori knowledge about the source and about the redundant mapping rule T as well as quality information about the channel status. The source symbol $u_i$ is assigned the channel symbol $v_{t_i}$.

With the aid of the mapping T, all $N < M = 2^m$ source symbols are mapped to the channel symbols $\{v_{t_1}, \ldots, v_{t_N}\}$ so that the expected value $$E_{U,\hat{U}_T}\{C(u, \hat{u}_T)\} = \min_T$$

is minimized to a quality measure $C(u, \hat{u}_T)$ related to source symbols, where $\hat{u}_T$ denotes the value of the source symbol estimated at the receiving end, taking into account the mapping T used for encoding.

In the method according to the invention, it is also possible to combine two or more source symbols and map them jointly to a channel symbol.

The mapping T may also be performed according to a linear channel code with $N=2^n < M=2^m$.

The encoder at the transmitting end may also be designed so that the mapping T can be adapted to the respective channel status during operation.

At the transmitting end, the binary patterns not occupied by the quantization levels Q<2M can be used, for example, to (a) transmit control information or (b) detect errors in the receiver. The control signals contain an identification for the parameters, for example. It is also possible to transmit a multiplex signal consisting of an information signal and a synchronizing signal or another signal containing accompanying information by means of two or more quantizers followed by one or more encoders.

Figure 8:
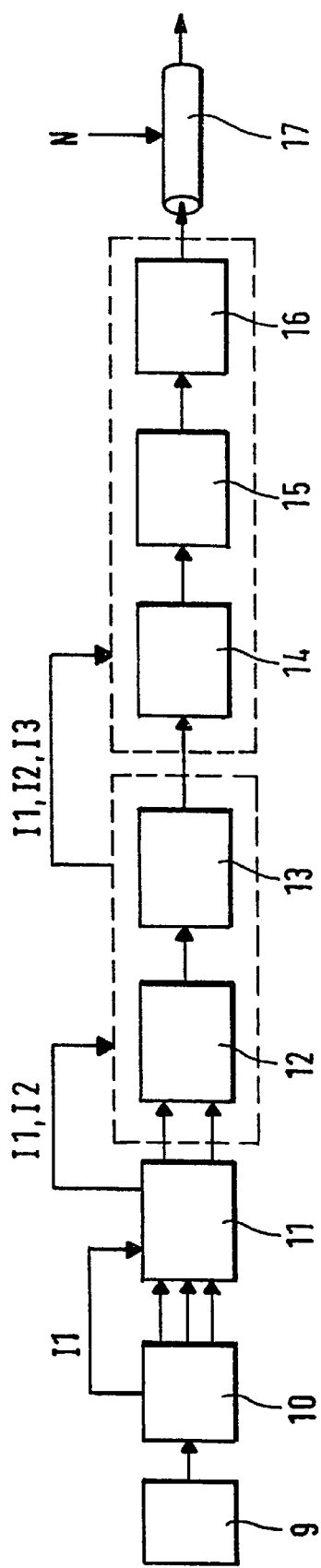
FIG. 8 is a schematic block diagram of the transmit-side portion of a further communications network according to the invention for digitally transmitting an analog signal.

The fifth embodiment will now be described with reference to FIGS. 8 and 9. FIG. 8 shows the transmit-side portion of the communications network according to the invention.

The transmit-side portion contains eight modules 9, 10, 11, 12, 13, 14, 15, 16.

Module 9 generates the analog signal to be transmitted. It is a signal source, such as a human being, a storage containing speech or video signals, a camera, etc. At the output of module 9, an analog signal, such as a speech signal or a video signal, is provided. This signal is supplied to module 10.

Module 10 is a converter that generates at least one parameter from the analog speech signal. The parameters are, for example, amplitude factors, filter coefficients, excitation vectors. The at least one parameter provided at the output of module 10 is fed into module 11. During operation, it may be necessary to change particular parameters, for example, to adapt them to current conditions of the transmission channel and/or the signal source. Information 11 about the characteristics of the parameters, their residual redundancy, and/or their statistical properties, which are described by means of Markov chains, for example, is stored and transferred to module 11.

Module 11 is designed as a quantizer. In the quantizer, the parameters are quantized into $Q=2^M$ or $Q<2^M$ quantization levels, for example, where M is the number of available bits. The quantization is performed using a nonlinear code or a linear code, for example. The parameters can be quantized separately or together. In the latter case, vector quantization is used, for example. During operation, it may be necessary to change the method of extracting the parameters, e.g. to adapt it to the current conditions of the transmission channel and/or signal source. Information 12 about the selection of the extraction method, the quantization method, and/or the existing residual redundancy is stored, for example in the form of a table, and transferred together with information 11 to module 12 and/or module 13. The quantized values are transferred to module 12.

Module 12 is designed as a mapper. The functions of modules 12 and 13 may, in suitable cases, be performed by only one module. Module 12 generates bit patters from the quantized values and feeds them into module 13.

Module 13 is designed as an outer channel coder. Here additional redundancy is selectively added to the bit patterns. Different redundancies can be added to different quantized parameter values. In the simplest case, redundancy can be introduced by a parity bit, for example; otherwise, it can be introduced by means of error-detecting or error-correcting codes, for example depending on the desired Hamming distance. For amplitude factors, for example, a higher redundancy, e.g. a higher Hamming distance, will be chosen than for excitation vectors. Information 11 and information 13 about the code construction is present at the receiving end as a priori information, i.e., it need not be transmitted constantly, but only on a change of the source coding (quantization) or channel coding. The information 12 is transmitted, e.g. as a multiplex signal or embedded in the data stream, over the transmission channel to the receiving end.

Prior to the transmission, the output signals of module 13 pass sequentially through modules 14, 15, 16. Module 14 is designed as a channel coder, where additional inner channel coding is performed. Module 15 is designed as an interleaver, where scrambling takes place. Module 16 is designed as a modulator where modulation, e.g. quadrature amplitude modulation (QAM), is effected.

The transmission channel 17 is affected by noise and/or multipath N, for example. The received signals are therefore distorted as compared to the transmitted signals.

Figure 9:
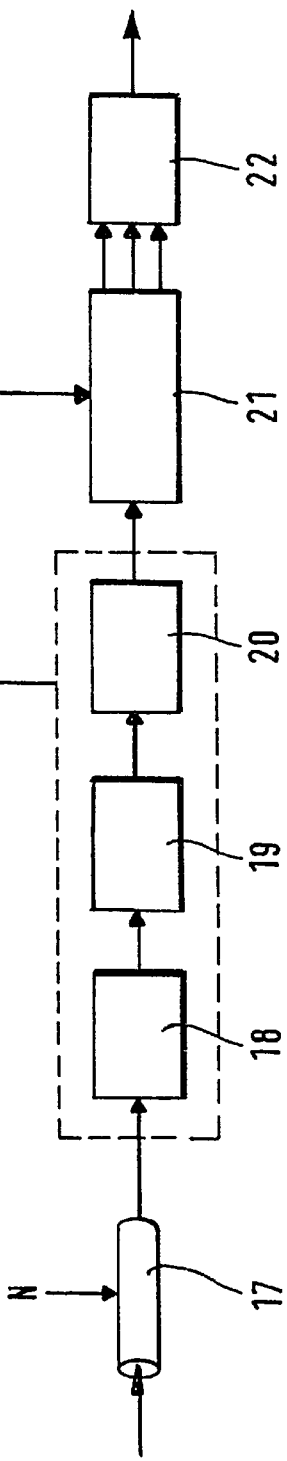
FIG. 9 is a schematic block diagram of the associated receive-side portion of the communications network of FIG. 8.

FIG. 9 shows the receive-side portion of the communications network according to the invention. The receive-side portion contains five modules 18, 19, 20, 21, 22.

Module 18 is designed as a demodulator and equalizer for demodulating the signals modulated by module 16. Module 19 is designed as a deinterleaver for descrambling the signals scrambled by module 15. Module 20 is designed as a channel decoder for decoding the signals channel-coded by module 14. At the output of module 20, bit patterns with code redundancy and with reliability values (soft-decision values) are provided, which are supplied to module 21.

Module 21 is designed as a parameter estimator. The parameter estimator performs a parameter estimation taking into account the a priori information 11 and 13, received information 12, and further information 14 and 15. The information 12 and the information 11 and 13 is determined from the received data stream by the parameter estimator itself or in a prestage which contains a demultiplexer, for example. The information 14 and 15 contains information about the transmission channel. Information 14 contains, for example, typical channel statistics about channel losses, etc. Information 14 is measured at start-up, for example, and transferred from the transmitting location to the receiving location and stored there.

Information 15 contains information about the current channel status. This includes, for example: the current received field strength, the current synchronization quality, the current quality of the filter adjustment of the channel equalizer, etc. Information 15 is determined in a prestage, for example. Information 14 and 15 may also be transmitted to the transmitting location. Quantization and redundancy coding in modules 11, 12, 13 can then be made dependent on information 14 and 15. In any case, the quantization and redundancy coding in modules 11, 12, 13 will be chosen so that parameter estimation can be performed in module 21 in the best possible way. Thus, the conditioning of the signal to be transmitted is optimized with respect to the properties of the parameter estimator, taking account of the channel characteristics. To this end, a calibration using test signals can be carried out in order to adaptively optimize the settings of the parameter estimator. Advantageously, the settings are also constantly readjusted during operation, so that an optimized parameter estimation can be performed. At the output of the parameter estimator, the estimated parameters are available, which are supplied to module 22.

Module 22 is designed as a converter which generates an analog output signal, the estimated source signal, from the estimated parameters.

Instead of a signal to which several parameters are assigned, two or more signals from different signal sources which are each assigned at least one parameter and which are quantized directly without parameterization can be conditioned by means of one or more quantizers for at least two parameters or by means of one or more encoders. At the receiving end, only one parameter or signal estimator is needed.

Combinations of the third to the fifth embodiments are also possible.

What is claimed is:

1. A method of encoding a signal from a source, particularly a message signal for speech and/or image transmission, said method comprising signal-matched encoding the signal with M bits using Q quantization levels, wherein $Q<2^M$; and protecting the signal against errors using at least part of a redundancy of bits remaining after quantization, wherein said signal-matched encoding and said protecting the signal against errors are performed at the transmitting end to encode the signal, the encoded signal is transmitted over a transmission channel, and at the transmitting end, at least a part of the redundancy of bits remaining, instead of or in addition to being used for error protection, is used to transmit a control signal.

2. A facility for encoding a signal from a source, particularly a message signal for speech and/or image transmission, said facility comprising:

a quantizer with $Q<2^M$ quantization levels; and an encoder for performing error protection encoding, wherein the signal is signal-matched encoded with M bits using Q quantization levels, the signal is protected against errors using at least part of a redundancy of bits remaining after quantization, the signal is signal-matched encoded and protected against errors at the transmitting end, the encoded signal is transmitted over a transmission channel, and at the transmitting end, at least a part of the redundancy of bits remaining, instead of or in addition to being used for error protection, is used to transmit a control signal.

* * * * *